United States Patent
Huang et al.

(10) Patent No.: US 7,042,884 B2
(45) Date of Patent: May 9, 2006

(54) NETWORK ADDRESS FORWARDING TABLE LOOKUP APPARATUS AND METHOD

(75) Inventors: Keng-Ming Huang, Ilan (TW); Chung-Ju Chang, Taipei (TW); Fang-Yong Lee, Hsinchu (TW); Kuang-Chih Liu, Hsinchu (TW)

(73) Assignee: Acute Technology Corp., (TW)

( * ) Notice: Subject to any disclaimer, the term of this patent is extended or adjusted under 35 U.S.C. 154(b) by 961 days.

(21) Appl. No.: 10/046,325

(22) Filed: Oct. 19, 2001

(65) Prior Publication Data

US 2003/0081554 A1 May 1, 2003

(51) Int. Cl.
*H04L 12/56* (2006.01)
*G06F 15/16* (2006.01)
*G06F 12/08* (2006.01)

(52) U.S. Cl. .................. 370/395.54; 709/245; 711/205; 711/207

(58) Field of Classification Search ........... 370/395.31, 370/395.54, 395.32, 409; 709/245; 711/202, 711/205, 206, 207
See application file for complete search history.

(56) References Cited

U.S. PATENT DOCUMENTS

| 6,549,536 B1 * | 4/2003 | Pavesi et al. ........... 370/395.31 |
| 6,880,064 B1 * | 4/2005 | Brown ........................ 711/216 |
| 2002/0080798 A1 * | 6/2002 | Hariguchi et al. ...... 370/395.31 |
| 2002/0172203 A1 * | 11/2002 | Ji et al. ...................... 370/392 |

* cited by examiner

*Primary Examiner*—Hassan Kizou
*Assistant Examiner*—Mohammad S. Adhami
(74) *Attorney, Agent, or Firm*—Fish & Richardson P.C.

(57) ABSTRACT

The present invention discloses a network address forwarding table lookup apparatus and method for identifying a network address to determine a next hop address to which data packets having the network address should be forwarded. The apparatus comprises a memory storing a compression-trie forwarding table. The forwarding table has multiple level modules in a compression-trie structure. With the present invention, it is possible to achieve fast IP address lookup with a compact-sized compression-trie forwarding table.

3 Claims, 7 Drawing Sheets

(b)

NETWORK ADDRESS FORWARDING TABLE LOOKUP APPARATUS AND METHOD

BACKGROUND OF THE INVENTION

1. Field of the Invention

The present invention relates to a network address forwarding table lookup apparatus and method, and particularly to an Internet Protocol (IP) address lookup apparatus and method with a compression-trie forwarding table.

2. Description of the Related Art

In the recent years, with development of network, it is convenient to transmit data between computers via Internet. A network address, such as an Internet Protocol (IP) address, is applied for recognizing address of a node on Internet. In an Internet node, such as a router, the IP address of data packets transmitted is recognized with a forwarding table, and destination of the data packets is recognized; thus, the data packets will reach their final destination through successive forwarding process.

In conventional network address lookup skill, the concept of network address prefix matching is widely used. Many research works on the forwarding engine of router use the rule of longest prefix matching in address lookup. An example of conventional network address lookup method is shown in FIG. 1. Assume that there is a network environment with network address length equal to 8 bits, and there are four prefix information with format of (prefix/next hop): . . . /1, 0010 . . . /3, 00101011/2, and 10100100/4, where " . . . " indicates the "don't care" bit. As shown in FIG. 1, a forwarding table 510 is thus derived from the prefix information, with its memory index order increase from left to right.

In the forwarding table 510, because of the longest prefix matching rule, an incoming data packet with destination address value in the range between 00100000 and 00101111 will be routed to the output port 3, except 00101011; the data packet with destination address 00101011 will be routed to the output port 2; the data packet with destination address 10100100 will be routed to the output port 4; and the data packet with other destination address will be routed to the output port 1. In order to save all output ports of the 8-bit network address (00000000 to 11111111), the forwarding table 510 has $2^8$ entries, with each entry occupies 1 byte (8 bits) memory; thus, the forwarding table 510 for the 8-bit network address occupies $2^8$ bytes memory, which is very large. Therefore, various methods are proposed to achieve smaller forwarding table.

FIG. 2a and FIG. 2b show a compression bit map (CBM) method of the conventional 8-bit network address forwarding table in FIG. 1. CBM forwarding table 520 sets each of the starting entries (network address 00000000, 00100000, 00101011, 00101100, 00110000, 10100100, 10100101) of the range in the forwarding table 510 by bit "1", and other entries by bit "0", as shown in FIG. 2a; and a next hop array (NHA) 530 sets the output ports of the starting entries, which occupies 7 bytes in this embodiment. Thus, the CBM forwarding table 520 and the NHA 530 occupies only ($2^8$ bits+7 bytes) memory space, which is smaller than the forwarding table 510.

FIG. 3 shows another conventional method of a two-level trie search data structure. In FIG. 3, Each level of the trie has 16 entries and its memory index order increase from left to right. In array 10 for example, the data packet with the first four bits of destination address which locates in ranges of 0000~0001, 0011~1001, and 1011~1111 will be forwarded to the output port 1. Otherwise, it will retrieve pointers B (0010) or C (1010) to do deeper level search. In the second level array 21, which refers to destination address with the first four bits of 0010, the data packet will be forwarded to the output port 3, while an exception of the destination address 00101011 to the output port 2. Similarly, in the second level array 22, which refers to destination address with the first four bits of 1010, the data packet will be forwarded to the output port 1, while an exception of the destination address 10100100 to the output port 4. The two-level trie structure forwarding table occupies $2^4$ bytes memory space in each array, which refers to a total of $3*2^4$ bytes memory in the example.

In Internet, however, data packet forwarding rate should be accelerated for providing higher-speed data transmission services while having smaller forwarding table. In other words, there are two preferred performance requirements of data packet forwarding: small forwarding table size, and fast lookup speed.

As a result, it is an object of the invention to disclose a network address forwarding table lookup apparatus and method that has a fast network address lookup speed with a compact-sized forwarding table.

SUMMARY OF THE INVENTION

To achieve the above-noted object, the present invention discloses a network address forwarding table lookup apparatus for identifying a network address to determine a next hop address to which data packets having the network address should be forwarded. The network address forwarding table lookup apparatus comprises a memory storing a compression-trie forwarding table, and the forwarding table has a first level module, a second level module, and a third level module.

The first level module comprises a first compression bitmap having first level index entries directly addressable by a first field of address bits from the network address of the data packets, and a first level pointer to the second level module. Each of the first level index entries alternatively comprises an independent index or a dependent index.

The second level module comprises second level primary entries directly addressable by the first level pointer and the first level index entries comprising the independent index. Each of the second level primary entries alternatively comprises a next hop index indicating the next hop address for the data packets while the first field of address bits is sufficient to determine the next hop index, or a second level submodule while the first field of address bits is not sufficient to determine the next hop address. The second level submodule comprises a second compression bitmap having second level index entries associatively addressable by a second field of address bits from the network address of the data packets, and a second level pointer to the third level module. Each of the second level index entries alternatively comprises the independent index or the dependent index.

The third level module comprises third level primary entries directly addressable by the second level pointer and the second level index entries comprising the independent index. Each of the third level primary entries comprises a next hop index indicating the next hop address for the data packets.

In the apparatus of the present invention, each of the first level index entries comprising the independent index directly corresponds to one of the second level primary entry; each of the first level index entries comprising the dependent index associatively corresponds to the second level primary entry to which the previous first level index entry comprising the independent index directly corresponds; each of the second level index entries comprising the independent index directly corresponds to one of the third level primary entry; and, each of the second level index entries comprising the dependent index associatively corresponds to the third level primary entry to which the previous second level index entry comprising the independent index directly corresponds.

Preferably, the forwarding table further has a fourth level module. In this case, each of the third level primary entries alternatively comprises a third level submodule while the first and second fields of address bits are not sufficient to determine the next hop address. The third level submodule comprises a third compression bitmap having third level index entries associatively addressable by a third field of address bits from the network address of the data packets, and a third level pointer to the fourth level module. Each of the third level index entries alternatively comprises the independent index or the dependent index. The fourth level module comprises fourth level primary entries directly addressable by the third level pointer and the third level index entries comprising the independent index, each of the fourth level primary entries comprising a next hop index indicating the next hop address for the data packets while the first, second and third fields of address bits are sufficient to determine the next hop index. And, each of the third level index entries comprising the independent index directly corresponds to one of the fourth level primary entry, and each of the third level index entries comprising the dependent index associatively corresponds to the fourth level primary entry to which the previous third level index entry comprising the independent index directly corresponds.

Preferably, the forwarding table further has a fifth level module. In this case, each of the fourth level primary entries alternatively comprises a fourth level submodule while the first, second and third fields of address bits are not sufficient to determine the next hop address. The fourth level submodule comprises a fourth compression bitmap having fourth level index entries associatively addressable by a fourth field of address bits from the network address of the data packets, and a fourth level pointer to the fifth level module. Each of the fourth level index entries alternatively comprises the independent index or the dependent index. The fifth level module comprises fifth level primary entries directly addressable by the fourth level pointer and the fourth level index entries comprising the independent index, each of the fifth level primary entries comprising a next hop index indicating the next hop address for the data packets while the first, second, third and fourth fields of address bits are sufficient to determine the next hop index. And, each of the fourth level index entries comprising the independent index directly corresponds to one of the fifth level primary entry, and each of the fourth level index entries comprising the dependent index associatively corresponds to the fifth level primary entry to which the previous fourth level index entry comprising the independent index directly corresponds.

The network address in the above-mentioned apparatus can be an Internet Protocol (IP) address. Further, in the above-mentioned apparatus, the independent index can be a bit '1', and the dependent index can be a bit '0'.

The present invention further discloses an IPv4 address forwarding table lookup apparatus for identifying a 32-bit Internet Protocol (IP) address to determine a next hop address to which data packets having the IP address should be forwarded. The apparatus comprises a memory storing a five-level compression-trie forwarding table, and the forwarding table has a first level module, a second level module, a third level module, a fourth level module, and a fifth level module.

The first level module comprises a first compression bitmap having two first level index entries directly addressable by the $17^{th}$ address bit from the IP address of the data packets, and a first level pointer to the second level module, wherein each of the first level index entries alternatively comprises a bit '1' or a bit '0'.

The second level module comprises second level primary entries directly addressable by the first level pointer and the first level index entries comprising the bit '1', each of the second level primary entries alternatively comprises a next hop index indicating the next hop address for the data packets while the first to the $17^{th}$ address bits of the IP address sufficient to determine the next hop index, or a second level submodule while the first to the $17^{th}$ address bits of the IP address are not sufficient to determine the next hop address, wherein the second level submodule comprises a second compression bitmap having 128 second level index entries associatively addressable by the $18^{th}$ to the $24^{th}$ address bits from the IP address of the data packets, and a second level pointer to the third level module, wherein each of the second level index entries alternatively comprises the bit '1' or the bit '0'.

The third level module comprises third level primary entries directly addressable by the second level pointer and the second level index entries comprising the bit '1', each of the third level primary entries alternatively comprises a next hop index indicating the next hop address for the data packets while the first to the $24^{th}$ address bits of the IP address are sufficient to determine the next hop index, or a third level submodule while the first to the $24^{th}$ address bits of the IP address are not sufficient to determine the next hop address, wherein the third level submodule comprises a third compression bitmap having two third level index entries associatively addressable by the $25^{th}$ address bit from the IP address of the data packets, and a third level pointer to the fourth level module, wherein each of the third level index entries alternatively comprises the bit '1' or the bit '0'.

The fourth level module comprises fourth level primary entries directly addressable by the third level pointer and the third level index entries comprising the bit '1', each of the fourth level primary entries alternatively comprises a next hop index indicating the next hop address for the data packets while the first to the $25^{th}$ address bits of the IP address are sufficient to determine the next hop index, or a fourth level submodule while the first to the $25^{th}$ address bits of the IP address are not sufficient to determine the next hop address, wherein the fourth level submodule comprises a fourth compression bitmap having 128 fourth level index entries associatively addressable by the $26^{th}$ to the $32^{nd}$ address bits from the IP address of the data packets, and a fourth level pointer to the fifth level module, wherein each of the fourth level index entries alternatively comprises the bit '1' or the bit '0'.

The fifth level module comprises fifth level primary entries directly addressable by the fourth level pointer and the fourth level index entries comprising the bit '1', each of the fifth level primary entries comprises a next hop index indicating the next hop address for the data packets;

In the apparatus, each of the first, second, third and fourth level index entries comprising the bit '1' directly corresponds to one of the next level primary entry in sequence, and each of the first, second, third and fourth level index entries comprising the bit '0' associatively corresponds to the next level primary entry to which the previous same level index entry comprising the bit '1' directly corresponds.

Further, the present invention discloses a network address forwarding table lookup method for identifying a network address with a compression-trie forwarding table to determine a next hop address to which data packets having the network address should be forwarded, and the compression-trie forwarding table has multiple level entries. The method comprises the steps of: retrieving a first field of address bits of the network address, and searching for a bit in the first level entries of the compression-trie forwarding table, wherein the bit directly corresponds to the first field; searching for an indicative entry in the next level entries of the compression-trie forwarding table, wherein the indicative entry associatively corresponds to the bit; obtaining a next hop index indicating the next hop address while the indicative entry comprises the next hop index; and retrieving a next field of address bits of the network address, and searching for a next bit in the indicative entry while the indicative entry does not comprise the next hop index, wherein the next bit associatively corresponds to the next field.

BRIEF DESCRIPTION OF THE DRAWINGS

The present invention can be more fully understood by reading the subsequent detailed description in conjunction with the examples and references made to the accompanying drawings, wherein:

FIG. 2b is a schematic view of the CBM forwarding table in FIG. 2a;

FIG. 5b is a schematic diagram showing the IP address forwarding operation in the embodiment of FIG. 5a.

DETAILED DESCRIPTION OF THE PREFERRED EMBODIMENT

The present invention will be hereinafter described in detail with the preferred embodiments in reference to FIG. 4, FIG. 5a, and FIG. 5.

Figure 1:
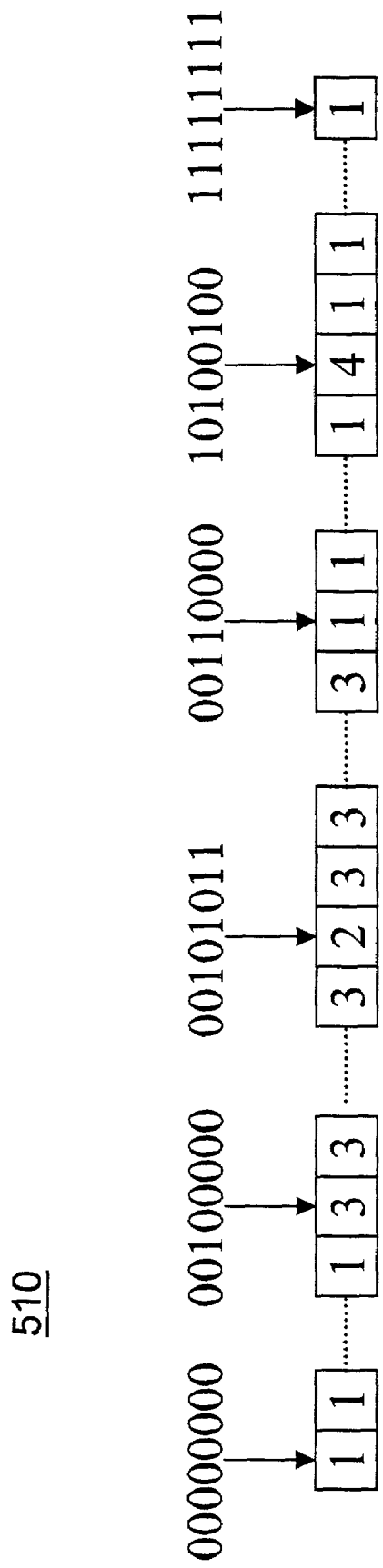
FIG. 1 is a schematic view of a conventional example of a 8-bit network address forwarding table.
Figure 2A:
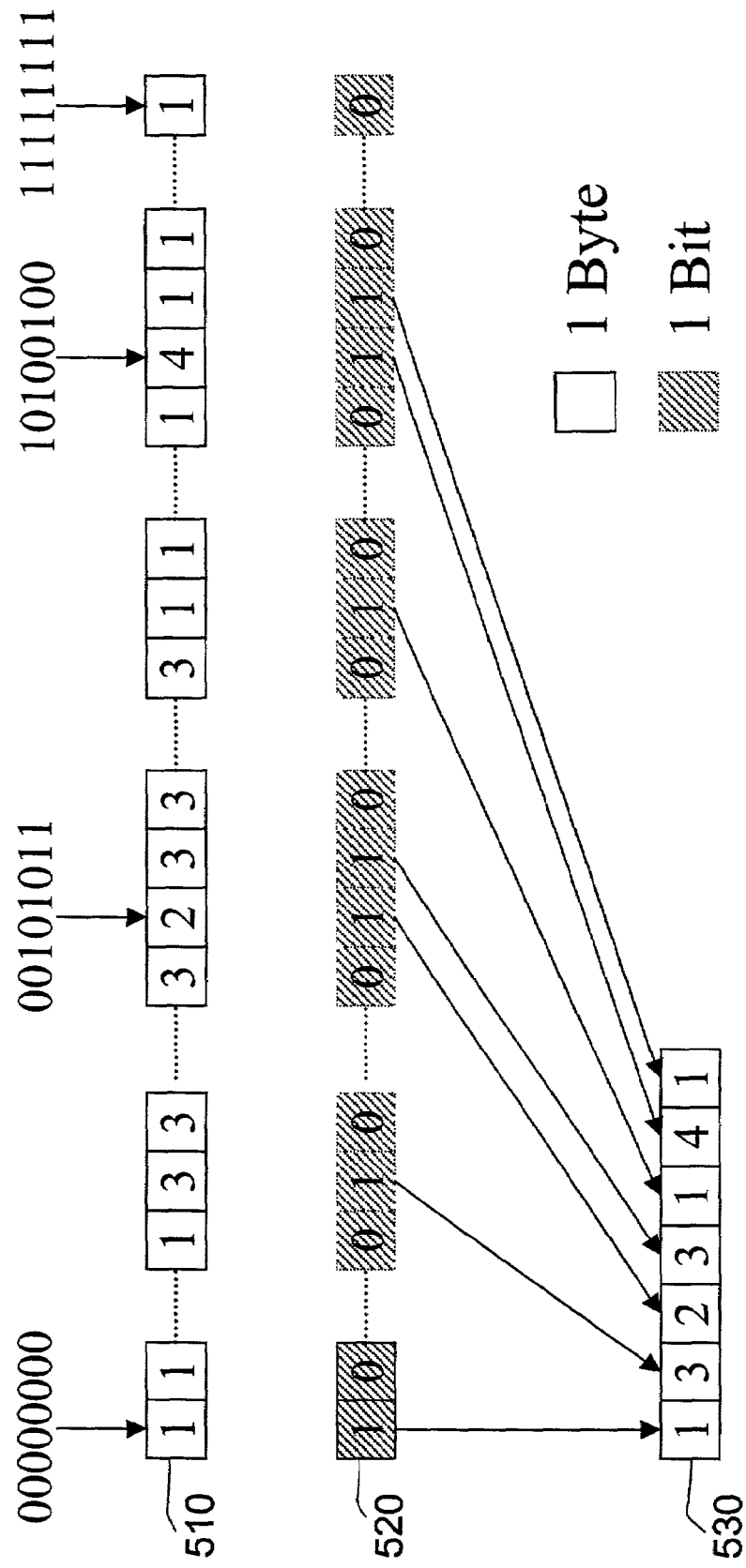
FIG. 2a is a schematic view of a CBM method of the conventional 8-bit network address forwarding table in FIG. 1.
Figure 2B:
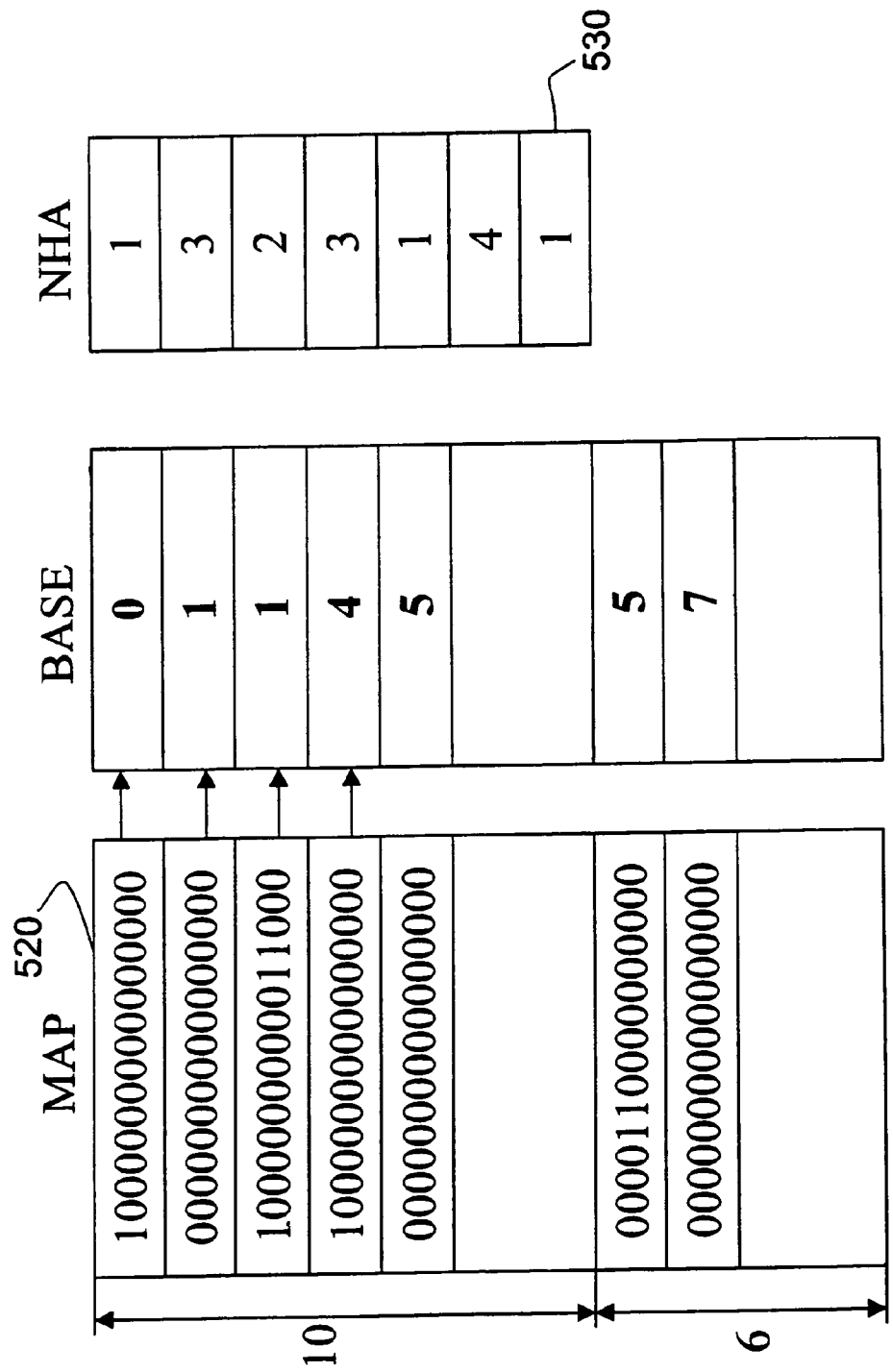
Figure 3:
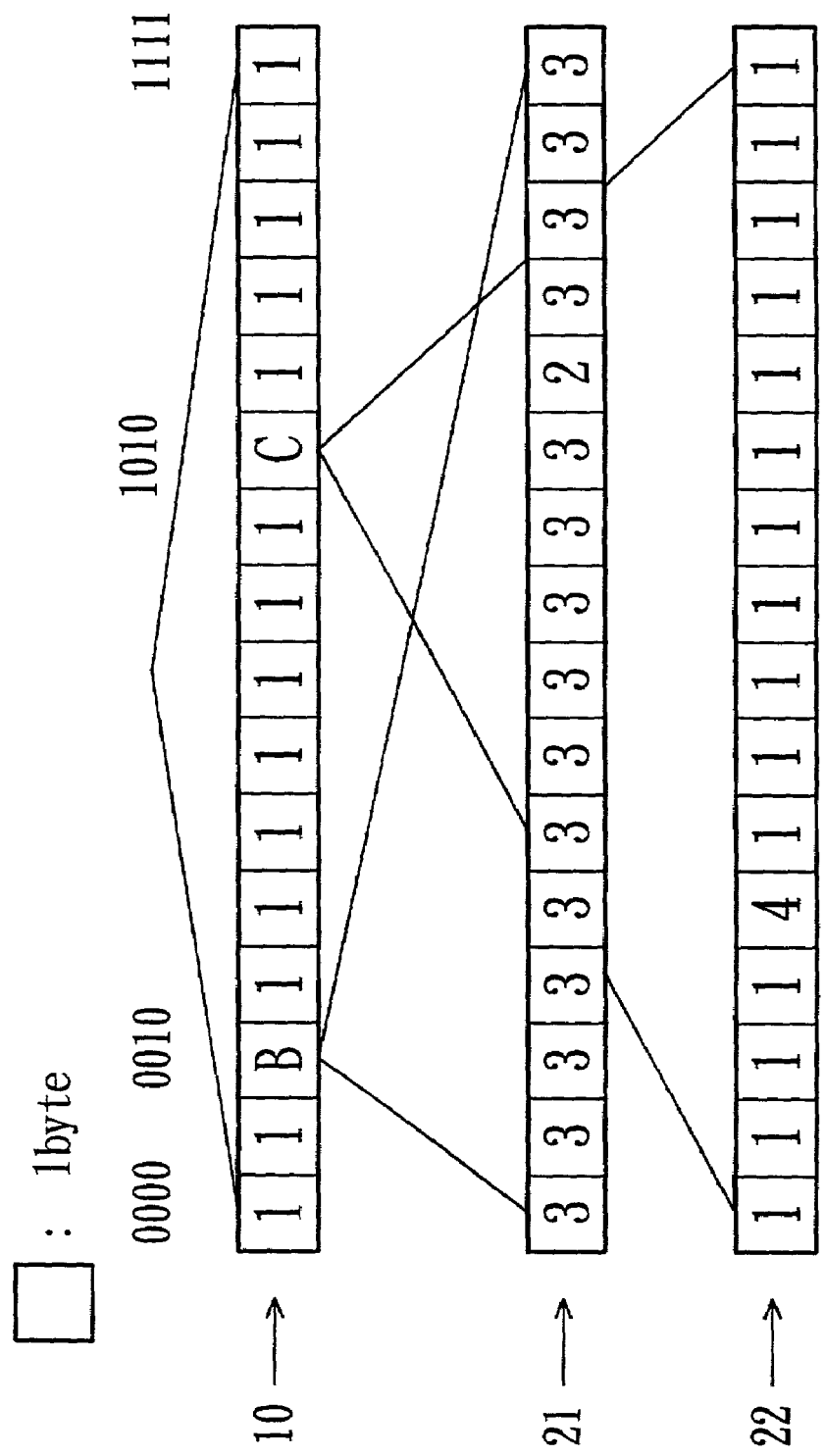
FIG. 3 is a schematic view showing a two-level trie compression search data structure in the prior art.
Figure 4:
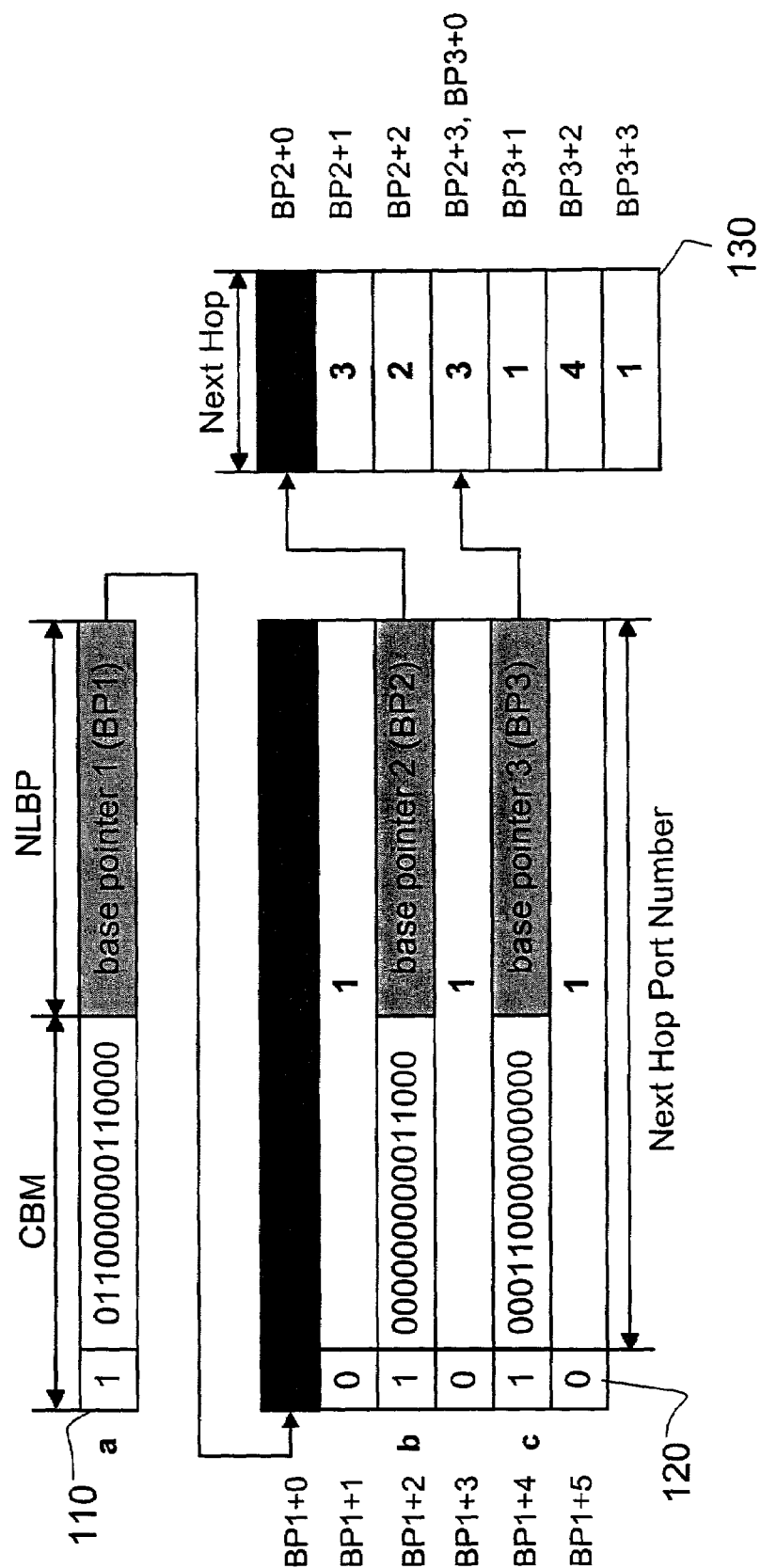
FIG. 4 is a schematic view of an embodiment showing the 8-bit network address forwarding table lookup apparatus of the present invention.

FIG. 4 is a schematic view of an embodiment of the 8-bit network address forwarding table lookup apparatus of the present invention. The 8-bit forwarding table has the same prefixes as mentioned in FIG. 1 to FIG. 3.

The present invention discloses a network address forwarding table lookup apparatus for identifying a network address to determine a next hop address to which data packets having the network address should be forwarded. The network address forwarding table lookup apparatus can be a memory storing a compression-trie forwarding table, such as the embodiment shown in FIG. 4, and the forwarding table in this has a first level module 110, a second level module 120, and a third level module 130. The first level module 110 has a first compression bitmap as shown in the CBM field of FIG. 4, and a first level pointer BP1. The CBM field of the first level module 110 has $2^4$ (16) first level index entries directly addressable by the first four address bits from the network address of the data packets, which can be referred to in FIG. 1. The first level pointer BP1 points to the second level module 120 on the position BP1+0. Each of the first level index entries stores an independent index such as a bit '1', or a dependent index such as a bit '0'. In the embodiment, each of the starting entries of the range in the first level index entries (that is, the five entries indicating 0000, 0010, 0011, 1010, 1011) by bit '1' and other entries by bit '0' as shown in FIG. 4.

The second level module 120 comprises five second level primary entries, which are directly addressable by the first level pointer BP1 and the first level index entries comprising bit '1'. In the embodiment, each of the first, third and fifth of the second level primary entries (BP1+1, BP1+3, BP1+5) has a next hop index '1' indicating the next hop address for the data packets while the first four address bits (0000 to 0001, 0011 to 1001, and 1011 to 1111) are sufficient to determine the next hop index. Each of the second and fourth of the second level primary entries (BP1+2, BP1+4) respectively has a second level submodule while the first four address bits (0010 and 1010) are not sufficient to determine the next hop address.

Each of the second level submodule has a second compression bitmap and a second level pointer (BP2, BP3). For example, the BP1+1 submodule (corresponding to the address 0010 . . . ) has a second CBM with second level index entries associatively addressable by the fifth to eighth address bits from the network address of the data packets, and each of the starting entries of the range in the second level index entries (that is, the three entries indicating 00100000, 00101011, and 00101100) stores bit '1', and other second level index entries stores bit '0', which is similar to the CBM in the first level module 110. The second level pointer BP2 points to the third level module 130 on the position BP2+0.

Similarly, the BP1+3 submodule (corresponding to the address 1010 . . . ) has a second CBM with second level index entries associatively addressable by the fifth to eighth address bits from the network address of the data packets, and each of the starting entries of the range in the second level index entries (that is, the three entries indicating 10100000, 10100100, and 10100101) stores bit '1', and other second level index entries stores bit '0'. The second level pointer BP3 points to the third level module 130 on the position BP3+0, which has the same position with BP2+3 in order to minimize the forwarding table size.

The third level module 130 has six third level primary entries directly addressable by the second level pointers BP2 and BP3 and the second level index entries storing bit '1'. Each of the third level primary entries has a next hop index; for example, BP2+1 indicates the next hop index '3', BP2+2 indicates a next hop index '2', and BP2+3 indicates a next hop index '3'. Similarly, BP3+1 to BP3+3 respectively indicates next hop index '1', '4' and '1'.

The embodiment in FIG. 4 has a three-level module structure in the forwarding table. It should be noted, however, that the present invention might have modules with more than three levels. Explanation of another embodiment will be hereinafter described.

Figure 5A:
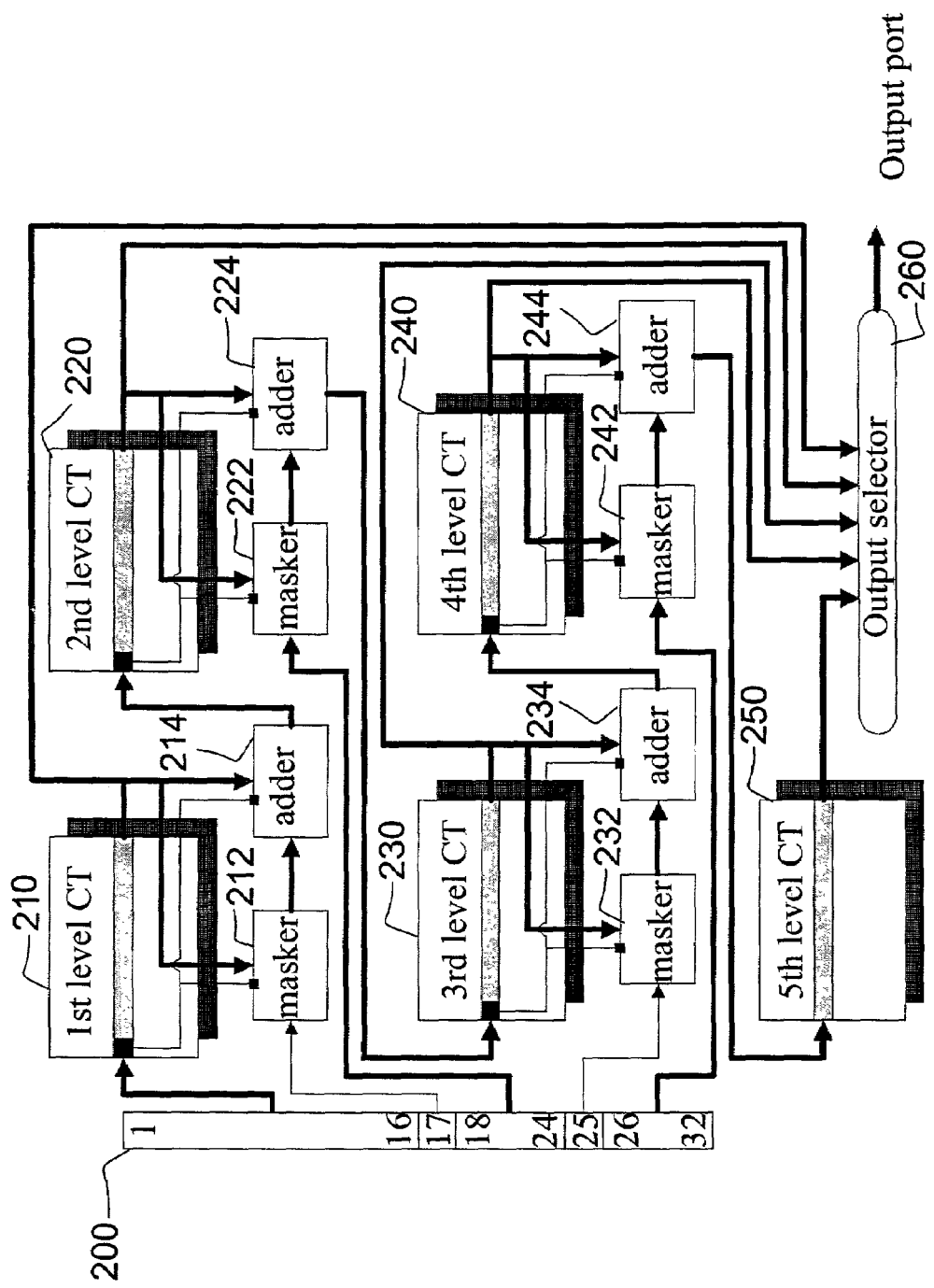
FIG. 5a is a block diagram of another embodiment showing the 32-bit IPv4 address forwarding table lookup apparatus of the present invention.
Figure 5B:
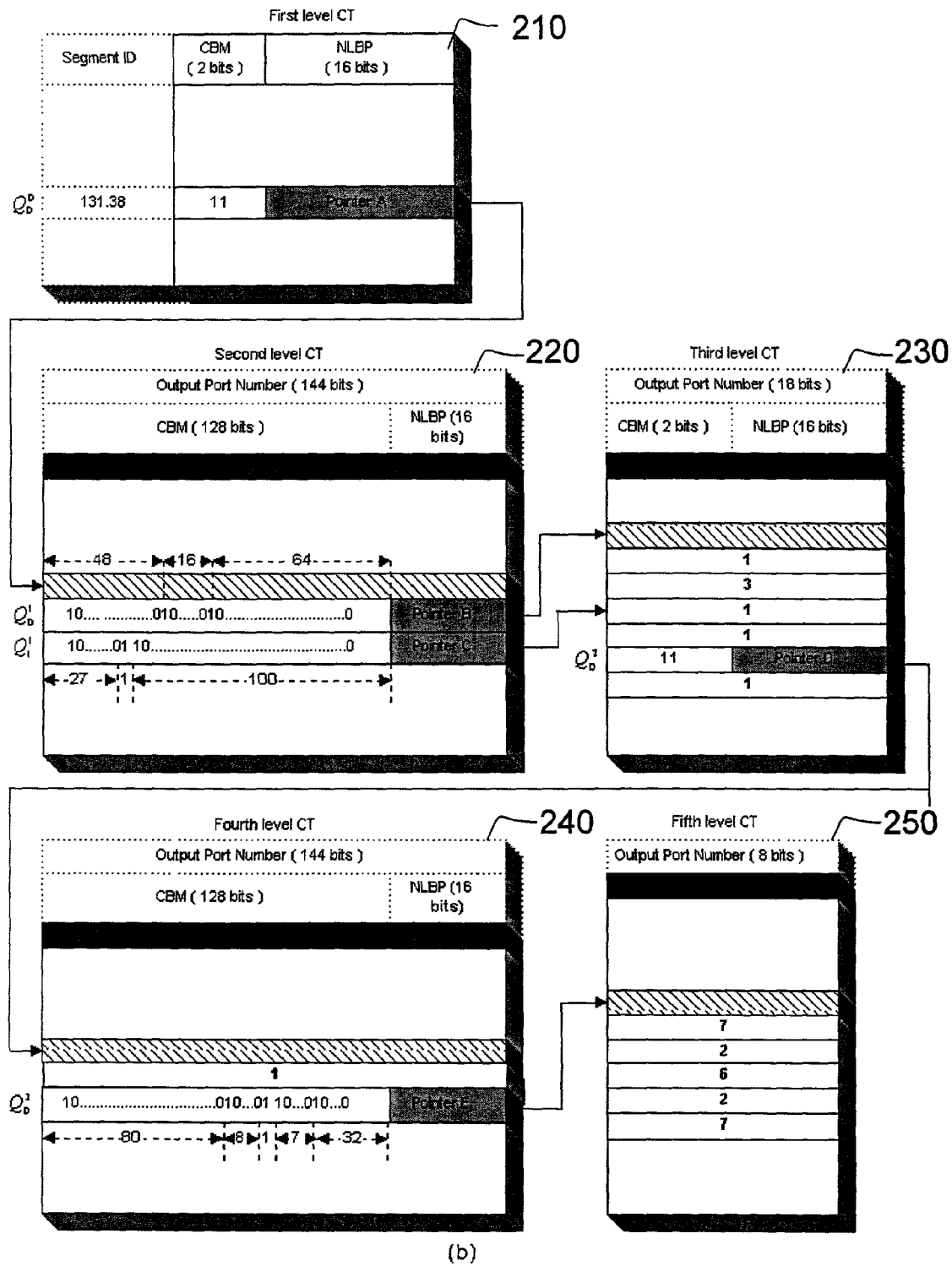

FIG. 5a and FIG. 5b shows an embodiment of the 32-bit IPv4 address forwarding table lookup apparatus. The 32-bit IP address 200 may be separated into several partitions, such as the (16, 1, 7, 1, 7) case in FIG. 5a.

The method of the present invention will be hereinafter described with the embodiment shown in FIG. 5a and FIG. 5b. First, a first field of address bits 1 to 16 of the IP address is retrieved and sent to the first level module, such as the first level CT 210. The first level CT 210 will search for a bit in the first level entries of the compression-trie forwarding table, the bit directly corresponds to the first field of address bits 1 to 16, such as the case of 131.38 in FIG. 5b. The first level CT 210 will then search for an indicative entry in the next level entries of the compression-trie forwarding table, such as the second level CT 220. The indicative entry is associatively corresponding to the bit in the first level entries, such as the first bit '1' in the CBM of the first level CT 210, so with the calculation of a masker 212 and a adder 214, the indicative entry will be conducted as shown in the arrows from the first level CT 210 to the second level CT 220. If the indicative entry does not comprise a next hop index, such as the case shown in FIG. 5b, the second level CT 220 will retrieve a next field of address bits, such as the case of the $17^{th}$ bit in FIG. 5a, and search for a next bit in the indicative entry. Similar operations go through the CTs 230, 240, and 250 at each next levels with calculation of maskers 222, 232, and 242 and adders 224, 234, and 244 in sequence, and a next hop index indicating the next hop address is finally obtained, and the data packet with the IP address can be sent out to the selected output port through an output selector 260.

It should be noted that the present invention is not limited to the embodiment of the (16, 1, 7, 1, 7) case in FIG. 5a. The inventor considered the depth of modules at each level, and how many module levels to which the forwarding table should partition in order to achieve a preferred embodiment in practical IP address forwarding operation. In determination of these factors, several embodiments were performed simulations and taken realistic routing prefix information of several Network Access Points (NAP) from the web site of the Internet Performance Measurement and Analysis (IPMA) Project. The results are shown in Table 1.

TABLE 1

| Embodiment NAP (# of prefixes) | 16, 1, 7, 1, 7 | 16, 1, 7, 2, 6 | 16, 1, 7, 3, 5 | 16, 2, 6, 1, 7 | 16, 2, 6, 2, 6 | 16, 2, 6, 3, 5 |
|---|---|---|---|---|---|---|
| Mae-east (57701) | 388 | 400 | 423 | 396 | 407 | 430 |
| Mae-west (36907) | 329 | 337 | 352 | 334 | 341 | 357 |
| AADS (24926) | 297 | 302 | 314 | 301 | 306 | 318 |
| Paix (12384) | 242 | 245 | 251 | 246 | 248 | 254 |

It is shown that, compared with other embodiments, the embodiment of the (16, 1, 7, 1, 7) case has a better performance. Further, in the case for a large routing table with over 57000 routing prefixes, the forwarding table size is less than 388 Kbytes, which is suitable for small SRAM implementation.

Since the present invention can be constructed quickly, it is easy to rebuild one or employ dual-copy tables for network node update. On the other hand, an address lookup can be finished in one to three memory accesses with the embodiment of the (16, 1, 7, 1, 7) case of the present invention; the worst case is five but it happens rarely.

While the present invention has been described with reference to the preferred embodiments thereof, it is to be understood that the invention is not limited to the described embodiments or constructions. On the contrary, the invention is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A network address forwarding table lookup apparatus for identifying a 32-bit network address to determine a next-hop address to which data packets having the network address are forwarded, the apparatus comprising:

a memory storing a five-level compression-tree forwarding table, the forwarding table having a first level module, a second level module, a third level module, a fourth level module, and a fifth level module;

the first level module comprising a first compression bitmap having two first level index entries directly addressable by the $17^{th}$ address bit from the network address of the data packets, and a first level pointer to the second level module, wherein each of the first level index entries alternatively comprises an independent index or a dependent index;

the second level module comprising second level primary entries directly addressable by the first level pointer and the first level index entries comprising the independent index, each of the second level primary entries alternatively comprising a next hop index indicating the next hop address for the data packets if the first to the $17^{th}$ address bits of the network address are sufficient to determine the next hop index, or a second level submodule if the first to the $17^{th}$ address bits of the network address are not sufficient to determine the next hop address, wherein the second level submodule comprises a second compression bitmap having 128 second level index entries associatively addressable by the $18^{th}$ to the $24^{th}$ address bits from the network address of the data packets, and a second level pointer to the third level module, wherein each of the second level index entries alternatively comprises the independent index or the dependent index;

the third level module comprising third level primary entries directly addressable by the second level pointer and the second level index entries comprising the independent index, each of the third level primary entries alternatively comprising a next hop index indicating the next-hop address for the data packets if the first to the $24^{th}$ address bits of the network address are sufficient to determine the next hop index, or a third level submodule if the first to the $24^{th}$ address bits of the network address are not sufficient to determine the next-hop address, wherein the third level submodule comprises a third compression bitmap having two third level index entries associatively addressable by the $25^{th}$ address bit from the network address of the data packets, and a third level pointer to the fourth level module, wherein each of the third level index entries alternatively comprises the independent index or the dependent index;

the fourth level module comprising fourth level primary entries directly addressable by the third level pointer and the third level index entries comprising the independent index, each of the fourth level primary entries alternatively comprising a next hop index indicating the next-hop address for the data packets if the first to the $25^{th}$ address bits of the network address are sufficient to determine the next hop index, or a fourth level submodule if the first to the $25^{th}$ address bits of the network address are not sufficient to determine the next hop address, wherein the fourth level submodule comprises a fourth compression bitmap having 128 fourth level index entries associatively addressable by the $26^{th}$ to the $32^{nd}$ address bits from the network address of the data packets, and a fourth level pointer to the fifth level module, wherein each of the fourth level index entries alternatively comprises the independent index or the dependent index; and the fifth level module comprising fifth level primary entries directly addressable by the fourth level pointer and the fourth level index entries comprising the independent index, each of the fifth level primary entries comprising a next hop index indicating the next hop address for the data packets;

wherein each of the first, second, third and fourth level index entries comprising the independent index directly corresponds to one of the next level primary entry in sequence, and each of the first, second, third and fourth level index entries comprising the dependent index associatively corresponds to the next level primary entry to which the previous same level index entry comprising the independent index directly corresponds.

2. The network address forwarding table lookup apparatus according to claim 1, wherein the network address comprises an Internet Protocol (IP) address.

3. The network address forwarding table lookup apparatus according to claim 1, wherein the independent index is a bit '1', and the dependent index is a bit '0'.

* * * * *